G. A. HUMASON.
APPARATUS FOR VAPORIZATION AND DISTILLATION OF PETROLEUM AND OTHER HYDROCARBON OILS.
APPLICATION FILED JULY 1, 1918.

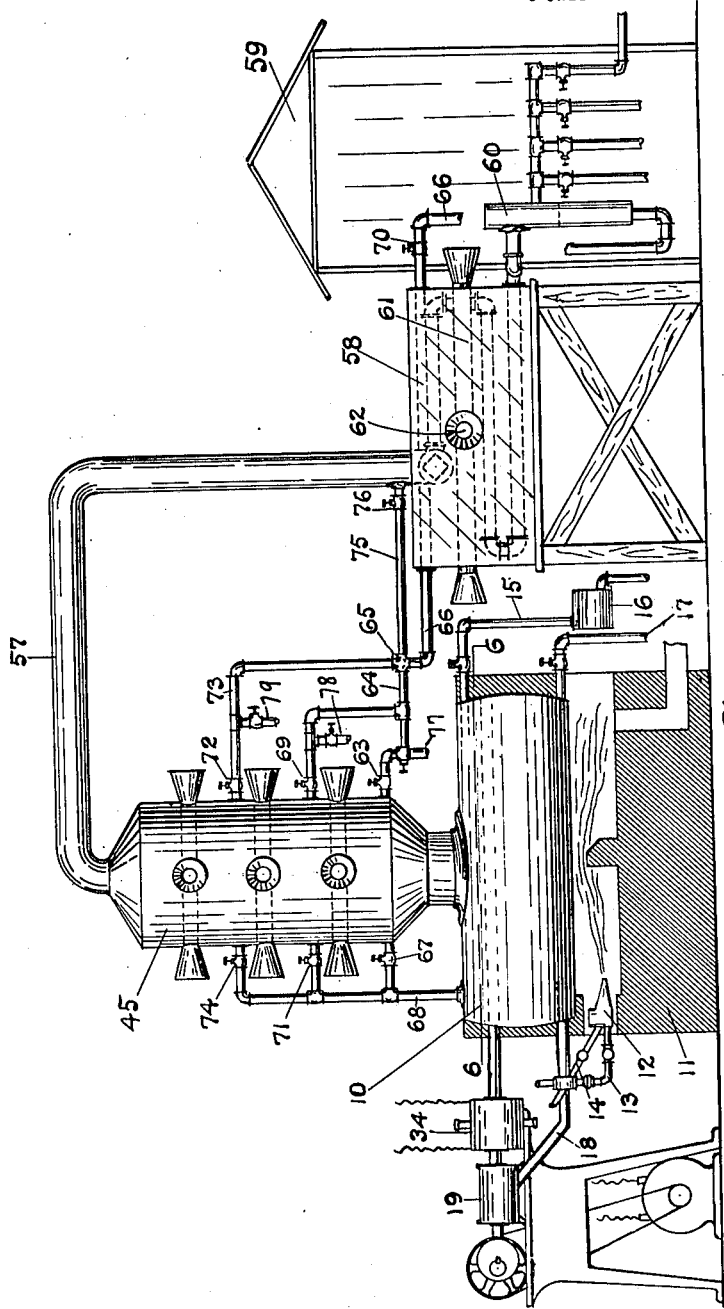

1,291,899.

Patented Jan. 21, 1919.
3 SHEETS—SHEET 2.

Granville A. Humason, INVENTOR.

BY Jesse R. Stone his ATTORNEY.

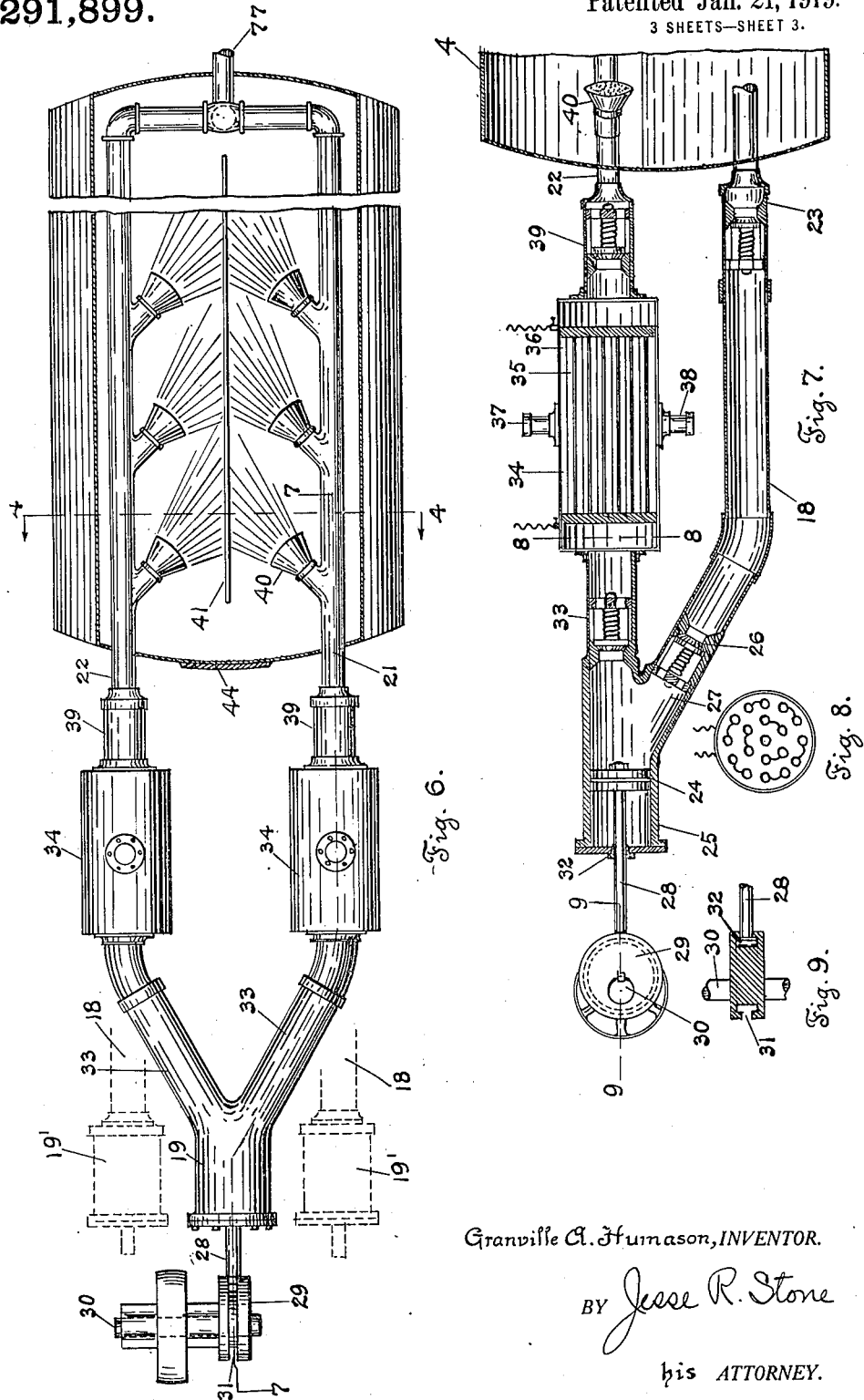

UNITED STATES PATENT OFFICE.

GRANVILLE A. HUMASON, OF HOUSTON, TEXAS, ASSIGNOR OF ONE-HALF TO JOHN W. PARKER, OF HOUSTON, TEXAS.

APPARATUS FOR VAPORIZATION AND DISTILLATION OF PETROLEUM AND OTHER HYDROCARBON OILS.

1,291,899. Specification of Letters Patent. Patented Jan. 21, 1919.

Application filed July 1, 1918. Serial No. 242,767.

*To all whom it may concern:*

Be it known that I, GRANVILLE A. HUMASON, a citizen of the United States, residing at Houston, Harris county, Texas, have invented a certain new and useful Improvement in Apparatus for Vaporization and Distillation of Petroleum and other Hydrocarbon Oils, of which the following is a full, clear, and exact description, such as will enable others skilled in the art to which it appertains to make and use the same.

My invention relates to an improvement in apparatus for vaporization and distillation of petroleum and other hydrocarbon oils for the purpose of separating the various hydrocarbon fluids of different boiling points.

In the distillation of petroleum or similar hydrocarbons for the special purpose of obtaining gasolene, the gradual rising of the boiling point of the liquid in the still, and the decomposition which takes place as the temperature increases, cause the resulting distillates to consist of light and heavy products having widely different boiling points. The light liquids cause the distillates to have a low fire test, while the presence of the heavy liquids injures the burning qualities of the gasolene. These effects are produced even when the proportion of light and heavy oils present are small. Furthermore when the distillation is in process, small quantities of the boiling crude oil are carried over mechanically by the current of rising vapor. This causes difficulty in use and gives a greenish or yellow tint to the distillate.

An object of my invention is to cause a condensation of the heavier distillates and a deposit of the suspended particles of crude oil in the passage of the vapors from the boiler to the condenser thus leaving product at the condenser outlet free of impurities and water—white in color.

Another object of my invention is to provide a novel and efficient separator through which the vapors are passed before they are conducted to the condenser and by means of which I obtain a condensation of the various products of fractional distillation, in the order of their various boiling points, in the different stages of the separator for use to mix with the lighter distillates to obtain a gasolene of the proper density.

Another object is to so spray the oil in the boiler as to obtain a "cracking" of the heavier hydrocarbon compounds and thus obtain production of a greater proportion of the lighter vapors going toward the composition of a greater proportion of gasolene.

Other objects and advantages will be clear to those skilled in the art to which my invention appertains from the more detailed description which follows and the same will be pointed out with more particularity in the claims.

Referring to the drawings forming a part of this specification and in which like parts are designated by like numerals throughout the several views:

Figure 1 is a view, more or less diagrammatic, showing an assembly of the different parts pertaining to the operation of my invention.

Fig. 6 is a top plan view of the boiler used in connection with my still, the top of same being cut away on the line 6—6 of Fig. 1.

Fig. 7 is a vertical longitudinal section of the pump and heater used in connection with my invention, taken on the line 7—7 of Fig. 6.

Fig. 8 is a transverse section of my electrical heater taken on the line 8—8 of Fig. 7.

Fig. 9 is a transverse section of the piston actuating means taken on the line 9—9 of Fig. 7, the piston rod being shown in elevation.

Figure 4:
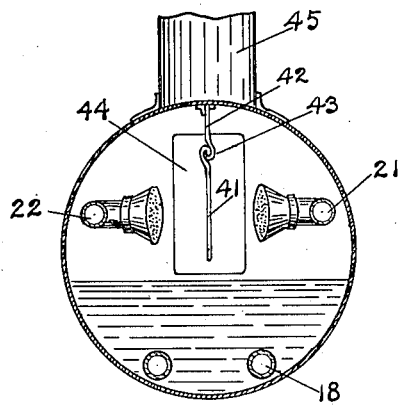
Fig. 4 is a transverse section of my separator on the line 4—4 of Fig. 6.
Figure 5:
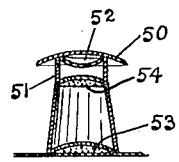
Fig. 5 is a longitudinal section of one of the inlet tubes used in my separator shown somewhat in perspective.
Figure 3:
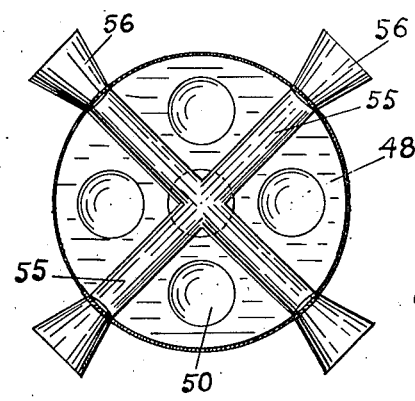
Fig. 3 is a transverse section on the line 3—3 of Fig. 2.

In the use of my invention the hydrocarbon oil to be distilled is pumped into a boiler or still 10, mounted over a furnace of masonry or other fire resisting material 11. Beneath the boiler I have mounted my oil burner shown diagrammatically at 12 to which are connected the steam pipes 13 and the oil pipe 14.

This apparatus is described in detail in my Patent No. 1,282,232, issued October 22nd, 1918. The oil to be distilled is pumped into the boiler through a pipe 15 by means of the pump 16 connected with an oil supply tank, not shown. The boiler is filled with oil to about one-half the height of the boiler and the operation of distillation is not continuous, one batch of oil being distilled before the boiler is again replenished. A pipe 17 is provided at the bottom of the boiler as an outlet, and as a means of cleaning the boiler after each operation.

The boiler is connected at the front end thereof by means of two pipes 18 with the pump 19 by means of which the oil is forced through an electrical heater 34 to the spray pipes 21 and 22 in the upper part of the boiler. The pump used in this operation is shown somewhat in detail in Fig. 7. But one pump is illustrated fully but it is obvious that two pumps could be used, one on each of the pipes 18, as shown in dotted lines at 19'. The pipes 18 leading from the lower part of the boiler are provided with valves 23 which open on the suction stroke of the pump piston 24 which is mounted to reciprocate in the cylinder 25. Another valve 26 is provided in each of the pipes, the same being inserted in the integral offset connections 27 of the cylinder itself. These valves are also adapted to open on the suction stroke of the pump, the two valves 23 and 27 being provided in each pipe to insure that there be no release of the pressure in the piston chamber on the working stroke thereof. The piston 24 is operated by means of the piston rod 28 connected with a cam wheel 29 mounted eccentrically upon the power shaft 30. The cam wheel 29 is provided with a peripheral T-shaped groove 31 in which the cross head 32 of the piston rod is adapted to slide. It will be noted that the power shaft 30 is on a direct line with the piston rod 28 which is adapted to reciprocate in the cylinder 25 through the stuffing box 32. The piston rod is held against lateral movement by its position in the cylinder, and the rotation of the power shaft 30, with the cam wheel 29 thereon, will give to the piston rod 28 a reciprocating motion of a length equal to the power stroke of the cam wheel 29. The outlet end of the cylinder has two branching pipes, as shown in my preferred embodiment, each of which has a valve 33 similar in construction to the valves 23 and 26 but adapted to open outwardly from the cylinder on the working stroke thereof, forcing the oil from the cylinder through the electrical heater shown at 34 through the pipes 35 therein. These pipes 35 are heated by means of the current of electricity passed back and forth through these tubes. Provision has also been made, however, for passing steam or other heated liquid through the chamber 36, in which the tubes 35 are mounted, by means of an inlet pipe 38 thereon. At the outlet end of the heater 34 is another valve 39 allowing passage of the liquid from the heating chamber into the spray tubes 21 or 22.

As shown particularly in Fig. 6 the pump is provided with two outlets and heaters, identical in structure, through which the oil will, under ordinary circumstances, pass in equal volume from the cylinder through the pipes 21 and 22 to the upper part of the still. The pressure is maintained in the pump to a high degree so that the oil passing through the pipes 21 and 22 will be sprayed with great force into the boiler through the spray nozzles 40, a plurality of which are provided on each side of the boiler. Between the two series of spray nozzles issuing from the pipes 21 and 22, respectively, is a baffle plate 41 which is shown, particularly in Fig. 4, as suspended from the top of the boiler by the plate 42 provided with a re-curved portion 43 adapted to receive slidably the similar coöperating hooked member on the baffle plate 41. The manhole 44 at the front end of the boiler is provided in order that access may be obtained to the inside of the boiler when desired, for cleaning purposes and also for the purpose of removing the baffle plate 41 to scrape away any deposits of carbon therefrom. A pipe 77 at the far end of the spray pipes 21, 22 may be provided to which may be attached a pressure gage, not shown.

It will be seen that the heated oil taken from the lower part of the boiler through the pump and sprayed into the space above the surface of the oil in the boiler will be heated to a high temperature in the electrical heater 34. The space in the upper part of the boiler being cooled by the contact of the air outside will be of a somewhat lower temperature than that of the oil in the boiler and of considerably lower temperature than that of the highly heated oil sprayed into this space. Furthermore the sprayed oil will issue from the nozzle under high pressure and will be broken up into fine particles and, because of the very high heat and pressure, will be subjected to a "cracking" which will break up the heavier hydrocarbon compounds into their elements which will unite to form the lighter compounds of which gasolene is the principal constituent.

Figure 2:
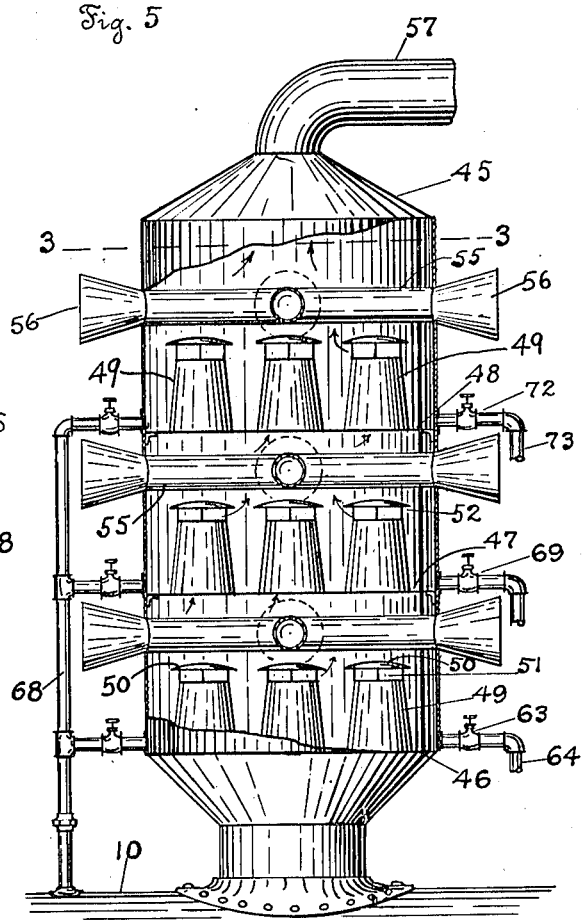
Fig. 2 is a side view of the separator used in connection with my invention with the front part of the casing thereof broken away to show the interior.

The vapors passing out of the still or boiler will be carried upwardly through the separator 45 on their passage to the condenser shown diagrammatically at 58 and from there will pass to the tail-house 59 where they will be collected in a receiving tank, not shown. The passage upwardly of the vapors into the separator will carry with them some small particles of the heavier oil entrained therewith from the still and these heavier oils being of high boiling point will, by coming in contact with the upper part of the still and the lower part of the separator, be partially condensed and dropped back into the boiler. The separator comprises a cylindrical-shaped casing having several horizontal partitions therein and in Figs. 1 and 2 I have shown three of the said partitions although it is obvious that more or less than this number could be used. These partitions, 46, 47 and 48 divide the separator into three chambers. Each of these partitions being identical, the description of one will suffice. The partition 46 closes the lower part of the still with the exception of five circular openings therein. Each of these openings has an upstanding frusto-conical tube 49 therearound. The smaller upper ends of the tubes 49 are each covered by a hood 50, spaced somewhat away from the upper end thereof by the small posts 51. The hood 50 is convexed upwardly and has on the under side thereof a smaller plate 52 attached thereto, this plate being convexed downwardly. At both the upper and lower ends of the tubes 49 are arranged small gauze partitions 53 and 54 which permit the passage therethrough of the rising hydrocarbon vapors, but also serve as a cooling surface for the purpose of assisting any condensing out of certain of the heavier vapors. As an additional cooling means in each of the chambers provided in the separator, I have arranged two horizontal intersecting tubes 55, set at right angles to each other and connected together at their points of intersection. These tubes lead outwardly through the side of the chamber and are provided at the outer ends with flaring bell-shaped funnels 56. These tubes and their bell-shaped ends serve as a means of conducting cooling air from outside the separator through the chambers to cool the vapors and thus serve to assist in condensing the hydrocarbon vapors passing therethrough.

The vapors rising from the still will pass upwardly through the partitions 46, 47 and 48 through the tubes 49 therein and will be deflected outwardly by the hoods 50. On their passage upwardly from the hoods they will come in contact with the tubes 55 and the vapors becoming cooled will be condensed when their boiling point is reached and will drop backwardly into the chamber. It is clear that the heavier vapors having the higher boiling point will be condensed first and will drop out to a large extent in the first chamber. In the second chamber more of these heavier vapors will be condensed and others of a slightly lower boiling point. And in the third chamber a further quantity of the still lighter vapors will be condensed and fall into the upper chamber. Those vapors still uncondensed, after being passed through the separator will be of a lighter and more volatile nature and will pass upwardly through the pipe 57 through which they will be conducted to the condenser 58 from which, after condensation, they will issue in fluid state into the water-trap 60 in the tail-house 59 and from thence to the storage tanks.

The condenser is a tank of ordinary construction adapted to be filled with water and has passing therethrough, at right angles to each other, two cooling air ducts 61 and 62 similar in construction to the tubes 55 in the separator, previously described. As the vapors pass through the pipe in this tank of water they will be cooled to such an extent that complete condensation thereof will take place. All of the crude oil and the heavier distillates will be condensed in the separator and, in fact, most of them will be condensed in the first chamber thereof. In the second chamber some of the next heavier distillates will be condensed, these being mostly in the nature of hydrocarbon oils of the viscosity of kerosene. The oils condensed in the upper chamber will be largely gasolene or naphtha while the lighter vapors passing over through the condenser will be found to be gasolene of a lighter specific gravity together with some of the still lighter oils.

The object of the processes carried out by means of my apparatus is to obtain a larger quantity of gasolene of a proper specific gravity for use in internal combustion motors and provision is made for mixture with the lighter and more volatile oils, which issue through the pipe 57 into the condenser, of some of the oils of a slightly heavier specific gravity to produce a resulting mixture which will be most efficient for the contemplated use.

The operation of my apparatus will be as follows. The oils condensed out in the first chamber will be tested by opening the lower right hand valve 63 which will allow an outlet of the oil from the lower chamber through the pipe 64 to the T-union 65 therein from which it will pass downwardly through pipes 66 through the upper part of the condenser into the tail-house where a sample may be obtained by opening the valve 70. If this sample is found to be strongly mixed with the heavier distillates the valve 63 will be again closed and the opposite valve 67 will be opened, allowing the distillates from this chamber to pass outwardly into the pipe 68 from which they will be conducted back into the boiler for a second distillation. The distillates in each of the next chambers will be treated in the same way. By opening the valve 69 the distilled oils from the second chamber are led through to the T-union 65 and the pipe 66 to the tail-house from which they may be sampled. If the distillates in this chamber are found to be unsatisfactory or discolored by means of some of the entrained oil, said distillates will be run outwardly through the valve 71 to the pipe 68 and back to the still.

The upper chamber has a similar outlet valve 72 and pipe 73 by which distillates may be conducted to the tail-house through the pipe 66, previously described, for sampling and if the same should not be found satisfactory the valve 72 would be closed and the oil would be let out through the valve 74 on the opposite side by way of the pipe 68 to the still for redistillation. In actual practice it has been found that most of the distillates from the upper chambers may be conducted directly into the condenser, together with the lighter vapors which pass out through the pipe 57 to the condenser. When it is desired to do this the valve 70 in the tail-house pipe is closed and further outlet at that point will be prevented. The oil will then pass from the T-union 65, by way of the pipe 75, through the valve 76 to the pipe 57 through which it will find passage to the condenser and the storage tank. It will be possible by means of this apparatus to conduct into the condenser any combination of the lighter oils or of the distillates produced in the upper chamber of the separator and if the proper gravity of oil is not thus obtained by the combination of some of the still heavier oils from the next lower chamber may also be run into the condenser for mixture with the lighter distillates. And it will be possible in some cases to use some of the distillates from the lowest chamber also. But as a rule the vapors condensed in the lowest chamber will find passage back into the still through the pipe 68. Each of the three outlet pipes is provided with a branch pipe, 77, 78, 79, respectively, from which oil from any of the chambers may be run into a separate receptacle.

From the description already given, the operation of my device will be easily understood by those skilled in the art. The oil will be heated in the boiler 10 from which it will be pumped through an electrical superheater 34, under high pressure, and will be sprayed into the upper part of the still where it will be most easily vaporized and pass upwardly into the separator. A large proportion of the heavier hydrocarbon compounds, through the "cracking" which will result from spraying the highly heated oil under excessive pressure into the still, will be converted into hydrocarbons of a more volatile nature with a lower boiling point and will hence be condensed in the upper part of the separator or in the condenser. A large proportion of gasolene will be obtained and, by means of my arrangement of pipes, a proper mixture to form a gasolene of the proper specific gravity will result. The separator which forms the principal part of my invention is found to be especially efficient. Vapor passing upwardly through the tubes 49 through the gauze partitions 53 and 54 therein, will, by contact with the metal, be somewhat cooled and the heavier constituents will be condensed. What vapors are not condensed will come in contact with the hood 50 and pass upwardly around the cooling pipes 55 where still further vapors will be condensed and dropped into the bottom of the chamber. This process will be repeated in each of the successive stages in my separator and it is obvious that the number of successive chambers in the separator may be as numerous as desired. No cooling liquid is necessary to precipitate the heavier oils and the heavier compounds will, in practice, be entirely condensed before leaving the separator and the compounds which pass from the top of the separator will be clear and of excellent quality. By my method of mixing the lighter oils of different specific gravity it will be possible to so arrange the pipes that the liquid issuing from the pipe 60 into the tail-house will show a gasolene of exactly the desired specific gravity without further mixture or distillation. The process is continued until the residue left in the still is of a heavy and tarry consistency and will then be drawn through the outlet pipe 17 and the still cleaned for another operation.

Having thus described my invention the objects and advantages of which will be clear, to those skilled in the art, without further description, what I claim as new and desire to protect by Letters Patent is:

1. In a device of the character described, a separator for oil vapors of different densities comprising a casing, perforated partitions arranged in vertical stages in said casing, tubes inclosing each of said perforations in said partitions, a hood over each tube and means of cooling the chambers between said partitions.

2. In a device of the character described, a separator for the separation of oil vapors of different densities, comprising a casing, horizontal partitions therein, each partition having a plurality of perforations therein, frusto-conical tubes over the perforations in said partitions, gauze baffles in said tubes, a deflecting hood over each tube and cooling air tubes in said separator.

3. In a device of the character described, a separator for oil vapors of different boiling points, comprising a cylindrical casing, a plurality of transverse partitions therein, tubes leading through said partitions, hoods over said tubes, and intersecting air pipes between the partitions, said pipes opening to the outer air for purposes of cooling the vapors.

4. In a device of the character described, a separator of oil vapors of different boiling points, comprising an upright casing, perforated transverse partitions in said casing, tubes over said perforations, gauze baffles in said tubes, hoods on said tubes, cooling means between said partitions, and separate pipes to conduct condensed vapors either to the boiler or to a condenser.

5. In a device of the character described, a separator for oil vapors of different boiling points comprising an upright cylindrical casing, transverse partitions in said casing, said partitions having hood-covered openings therein and air pipes passing transversely through the casing between said partitions, said pipes opening at the outside of the casing, and funnel shaped ends on said pipes outside said casing to furnish an entrance of air through said pipes for cooling purposes.

6. In a device of the character described, a separator for oil vapors of different densities comprising a casing divided transversely into separate chambers, frusto-conical tubes leading from one chamber to another, gauze partitions in said tubes, hoods on said tubes and deflecting plates on the under side of said hoods to deflect the vapors outward into the said chambers.

7. In a device of the character described, a separator for oil vapors of different densities comprising a casing divided transversely into separate chambers, tubes connecting the different chambers, deflecting hoods on said tubes and air pipes passing through said chambers for cooling purposes and means to allow free entrance of air to said pipes.

8. In a device of the character described, a boiler, a separator connected therewith, condensing chambers in said separator, a vapor outlet pipe from said separator, a condenser on said pipe, and means to automatically mix the distillates from any of said chambers with the distillates from said pipe to form a liquid of the desired gravity.

9. In a device of the character described, a boiler, separating chambers in series connected therewith, an outlet pipe for vapors passing through said chambers, a condenser on said pipe, a tail house, a separate container therein, connecting pipes from each of said chambers to said condenser and to said tail house whereby the distillates from either or all of said chambers may be mixed with the condensed oil in said condenser, or may be discharged into said separate container.

In testimony whereof, I hereunto affix my signature this the 26th day of June, 1918.

GRANVILLE A. HUMASON.